US009143317B2

(12) United States Patent
Chevallier-Mames et al.

(10) Patent No.: US 9,143,317 B2
(45) Date of Patent: Sep. 22, 2015

(54) PROTECTING AGAINST WHITE BOX ATTACKS USING COLUMN ROTATION

(71) Applicant: Apple Inc., Cupertino, CA (US)

(72) Inventors: Benoit Chevallier-Mames, Paris (FR); Mathieu Ciet, Paris (FR); Thomas Icart, Paris (FR); Bruno Kindarji, Paris (FR); Augustin J. Farrugia, Los Altos Hills, CA (US)

(73) Assignee: Apple Inc., Cupertino, CA (US)

( * ) Notice: Subject to any disclaimer, the term of this patent is extended or adjusted under 35 U.S.C. 154(b) by 147 days.

(21) Appl. No.: 13/902,723

(22) Filed: May 24, 2013

(65) Prior Publication Data

US 2014/0348323 A1 Nov. 27, 2014

(51) Int. Cl.
*H04L 29/06* (2006.01)
*H04L 9/06* (2006.01)
*H04L 9/00* (2006.01)

(52) U.S. Cl.
CPC .............. *H04L 9/0631* (2013.01); *H04L 9/002* (2013.01); *H04L 2209/16* (2013.01)

(58) Field of Classification Search
CPC ..... H04L 9/28; H04L 9/0631; H04L 2209/24; H04L 2209/08; G06F 7/766; G06F 7/582
USPC .......................................................... 380/28
See application file for complete search history.

(56) References Cited

U.S. PATENT DOCUMENTS

| 7,236,593 | B2 | 6/2007 | Lu et al. | |
|---|---|---|---|---|
| 7,508,937 | B2 | 3/2009 | Stein et al. | |
| 7,936,873 | B2 | 5/2011 | Farrugia et al. | |
| 8,121,286 | B2 | 2/2012 | Halevi et al. | |
| 8,256,005 | B2 | 8/2012 | Lerouge et al. | |
| 2011/0188651 | A1 | 8/2011 | Iswandhi et al. | |
| 2011/0305334 | A1* | 12/2011 | Nakamura | 380/255 |
| 2012/0268142 | A1* | 10/2012 | Kremin et al. | 324/658 |
| 2013/0259224 | A1* | 10/2013 | Lee et al. | 380/28 |

OTHER PUBLICATIONS

S. Chow et al., "White-Box Cryptography and an AES Implementation", Aug. 15-16, 2002, pp. 18, Cloakware Corporation, Ottawa, Canada.
"iOS Security", May 2012, pp. 20.
Shay Gueron, "Intel Advanced Encryption Standard (AES) New Instructions Set", Intel Artchitecture Group, Isareal Development Center, Intel Corporation, Sep. 2012, pp. 94, Revision 3.01.
S. Chow, "A White-Box DES Implementation for DRM Applications", Oct. 10, 2002, pp. 16, Cloakware Corporation, Ottawa, Canada.

* cited by examiner

*Primary Examiner* — Harunur Rashic
(74) *Attorney, Agent, or Firm* — Blakely, Sokoloff, Taylor & Zafman LLP (57) ABSTRACT

Various embodiments of a computer-implemented method of information security using block cipher column rotations are described. The cipher state column rotations provide resistance to white box side channel memory correlation attacks designed to reverse-engineer a symmetric cipher key associated with the information security system. The column rotation operations can be performed on the cipher state of a block cipher, and then removed from the result, to provide obfuscation of the data when in memory, while not impacting the resulting output of the cipher or decipher operation. The method additionally includes performing a first rotation of an iteration specific cipher subkey according to the first rotation index, performing an iteration of the block cipher operations on the cipher state matrix, and rotating the columns of the cipher state matrix according to an inverse of the first rotation index.

20 Claims, 9 Drawing Sheets

PROTECTING AGAINST WHITE BOX ATTACKS USING COLUMN ROTATION

BACKGROUND OF THE DISCLOSURE

Information security is the general practice of defending information from unauthorized access, disclosure, modification, or other related activities. In the computer security realm, this can include tasks such as data encryption, including file encryption for individual files, folders, or volumes, up to and including whole disk encryption. Additionally, access to computer systems, electronic data, or user accounts can be gated by an account authorization process, which can involve several levels of information security. Additionally, copyright holders can use digital rights management (DRM) technologies to limit the use of digital content to usages that are authorized by the rights holders. Each of these technologies employs data encryption technologies as an information security measure.

A specific type of data encryption works on finite blocks of data. These block ciphers are designed to encrypt a specific amount of data in one pass of the cipher. Unencrypted data, referred to as "cleartext" or "plaintext," is divided into data blocks according to the pre-defined block size of the block cipher, and each block is processed. The Advanced Encryption Standard is one example of a block cipher. The specification for the Advanced Encryption Standard (AES) can be found in *Announcing the Advanced Encryption Standard (AES)*, Federal Information Processing Standards Publication 197, Nov. 26, 2001, which is incorporated herein by reference.

AES is an iterated block cipher based on a substitution-permutation network. Electronic data is processed 16 bytes (128 bits) at a time using a 128, 192, or 256-bit cipher key. The AES algorithm iterates upon a state buffer, which can be represented as a 4×4 column-major order matrix of bytes. First, a block of unencrypted data is loaded into the state buffer. In the initial round of AES, the data in the state buffer is combined with the first "round key," which is a sub-key derived from the cipher key using a key schedule algorithm. Subsequently, multiple "rounds" of substitution and permutation are performed on the AES State, and during each round, an additional sub-key derivation of the encryption key is added to the AES State. Decryption of encrypted data is performed using the inverse of the encryption operations.

Figure 1:
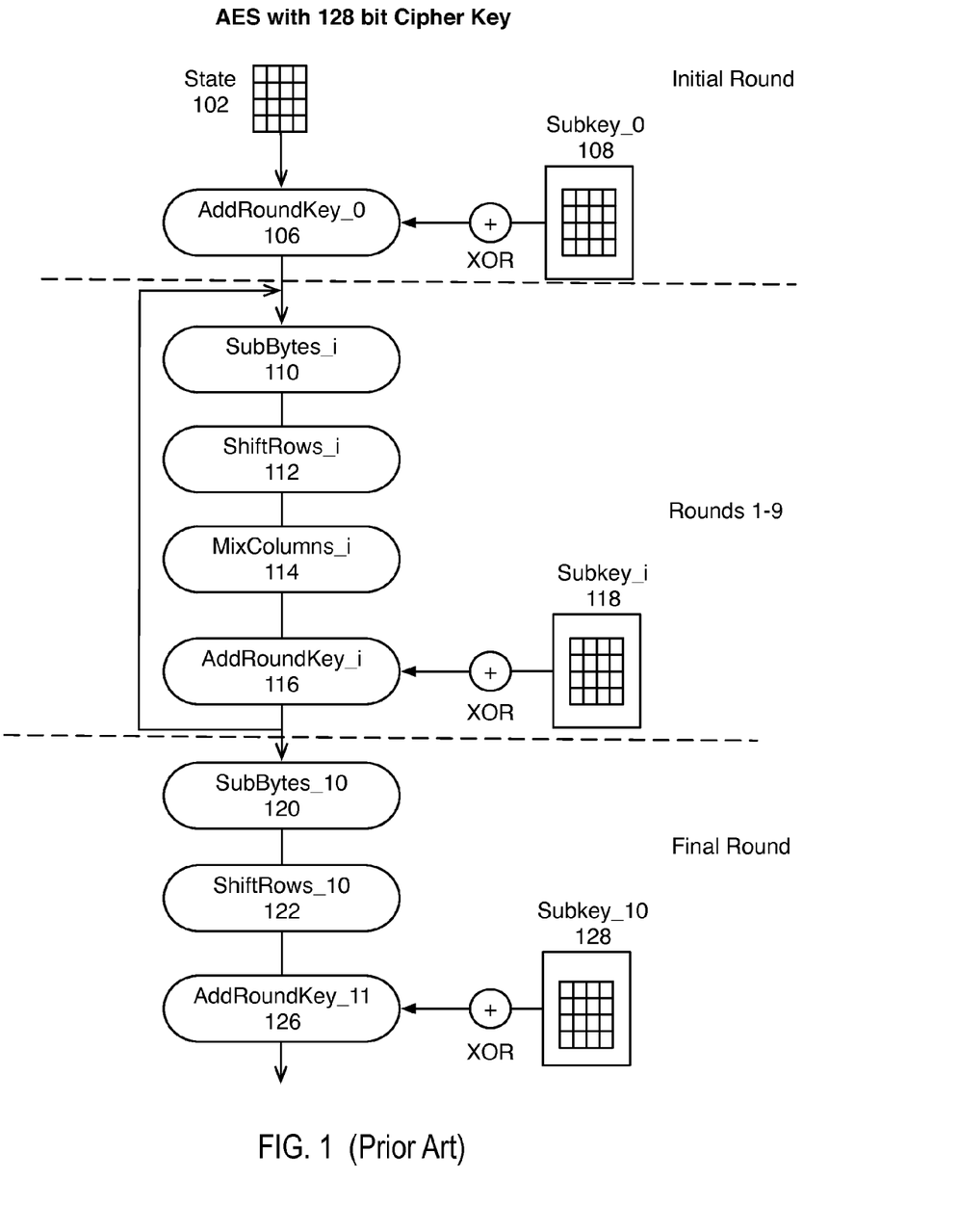
FIG. 1 is an illustration of a state buffer transition through the various operations of the Advanced Encryption Standard (AES) algorithm.

FIG. 1 is an illustration of a state buffer transition through the various operations of the AES algorithm. The basic AES operations are AddRoundKey, SubBytes, ShiftRows, and MixColumns. In the exemplary illustration, 11 rounds of operations are performed using an 128 bit cipher key. In the initial round, a buffer containing the AES state 102 is loaded with unencrypted data, and an initial AddRoundKey operation (e.g., AddRoundKey_0 106) is performed. In an AddRoundKey operation, each byte of the state buffer 102 is combined with a subkey (e.g., Subkey_0 108), which is derived from the secret cipher key. The subkey for each round is the same size as the state (16-bytes), and is generated from the secret cipher key using a key-scheduling algorithm. The subkey is combined with the state once each round using an exclusive or (XOR) operation.

In round 1 through round 9, each of the AES operations is performed once. The Substitute Bytes (SubBytes) operation performs non-linear substitutions in which each byte is replaced with another byte according to a lookup table. The ShiftRows operation performs a transposition in which each row of the state buffer is shifted cyclically a certain number of steps. The MixColumns operation is a mixing operation in which the four bytes of each column of the state buffer are combined using a linear transformation, where each column is treated as a four-term polynomial. Accordingly, for each iteration "i," a SubBytes_i 110, a ShiftRows_i 112, a MixColumns_i 114, and an additional AddRoundKey_i 116 is performed on the block cipher. During the AddRoundKey_i 116 operation, a round specific Subkey_i 118 is combined with the State 102 with an XOR operation.

In the final round, the MixColumns operation is omitted, and a SubBytes_10 120, ShiftRows_10 122, and a final AddRoundKey_11 126 operation is performed, in which the $11^{th}$ Subkey (e.g., Subkey_10 126) is XORed with the AES state buffer 102. The decryption of AES encrypted data is performed by performing the inverse of each encryption operation in the inverse order of the encryption operation. The inverse operation of AddRoundKey is an additional AddRoundKey operation. The InverseSubBytes operation performs table lookup to perform the inverse of the byte substitution, as does the InverseMixColumn operation. The InverseShiftRows operation inverts the ShiftRows operation performed during the data encryption.

SUMMARY OF THE DESCRIPTION

Various embodiments of a computer-implemented method of information security using block cipher column rotations are described. The cipher state column rotations provide resistance to white box side channel memory correlation attacks designed to reverse-engineer a symmetric cipher key associated with the information security system. In one embodiment, the method includes rotating the columns of the cipher state matrix according to a first rotation index, rotating the columns of a round key derived from the symmetric cipher key of the block cipher algorithm, performing a round of the block cipher algorithm, and then removing the column rotation from the output of the cipher round. The column rotation operations can be performed on the cipher state, and then removed from the result, to provide obfuscation of the data when in memory, while not impacting the resulting output of the cipher or decipher operation. The method additionally includes performing a first rotation of an iteration specific cipher subkey according to the first rotation index, performing an iteration of the block cipher operations on the cipher state matrix, and rotating the columns of the cipher state matrix according to an inverse of the first rotation index.

Also described is an embodiment of an electronic device having an iterated block cipher based information security system, which provides resistance to white box, and side channel attacks. The device includes a data storage module, which is a form of nonvolatile memory, such an electrically erasable semiconductor memory, to store protected data. Also included is on the data storage is an encrypted key repository which contains cipher keys associated with a user of the electronic device. The device also includes a network client, to communicate over a network with an online store, and a processor coupled to the network client and the data storage module. The processor can have one or more cores, and the device can have multiple processors. The processor can process instructions to manage the iterated block cipher based information security system. The instructions can cause the processor to perform operations to rotate the columns of the cipher state matrix according to a first rotation index, rotate the columns of an iteration specific cipher subkey according to the first rotation index, perform an iteration of the block cipher operations on the cipher state matrix, and rotate the columns of the cipher state matrix according to an inverse of the first rotation index.

Also described is a non-transitory computer readable media, which stores instructions for performing one or more of the operations described herein.

While the above summary does not include an exhaustive list of all aspects of the various embodiments, it is contemplated that the various embodiments include all systems and methods that can be reasonably practiced from the suitable combinations of the various aspects summarized above, and as well as those disclosed in the Detailed Description below.

BRIEF DESCRIPTION OF THE DRAWINGS

The following description includes discussion of figures having illustrations of exemplary implementations of the various embodiments, and the figures should be understood by way of example, and not by way of limitation. References to one or more "embodiments" are to be understood as describing a particular feature, structure, or characteristic included in at least one implementation, but do not necessarily all refer to the same embodiment, although embodiments are not necessarily mutually exclusive. In the accompanying figures, like references indicate similar elements, and in which.

The processes depicted in the figures described above are performed by processing logic that comprises hardware (e.g., circuitry, dedicated logic, etc.), or a combination of both hardware and software. Although some of the processes are described in terms of sequential operations, some of the operations described may be performed in a different order, while some operations may be performed in parallel, or in parallel with other operations.

DETAILED DESCRIPTION

The relative strength of iterated block ciphers such as AES is not the complexity of the algorithm, but the complexity of the cipher key, which must remain secret for encrypted data to remain secure. The analysis of reverse-engineering threats under the traditional cryptographic model assumes a "black-box" threat model as used in black-box symmetric-key cryptography implementations. Symmetric key ciphers use the same key for encryption and decryption, so preventing the reverse engineering of the cipher key is of significant importance. One example of a black-box attack is the adaptive chosen plaintext attack. In this model, the execution of the algorithm is not visible to the attacker, and the attacker does not know the encryption key. However, the attacker knows the cryptographic algorithm used, controls the input plaintext that is encrypted, and has access to the resulting output ciphertext. Theoretically the attacker can use known information to derive the unknown cipher key, although the process is so computationally intensive as to be impractical.

Notwithstanding the difficulty of generating a cryptographic break to encryption algorithms under a black box threat model, real world implementation of software based information security systems are subject to a "white-box" threat model. Encryption systems may execute on compromised or untrusted platforms, and should be resilient enough to operate safely in environments where an attacker has control over the execution of the cryptographic algorithm. For example, a reverse engineering attack can find an instruction result during the execution of a protected file or binary, which can allow the attacker to determine or extract the cryptographic key by observing operations and instructions that act on the secret key. Such "side channel attacks" are based on information gained from the actual implementation of the cryptographic system. If an attacker has control over a platform that is executing software based encryption, the attacker can potentially learn the secret encryption key by observing the execution of the encryption algorithm.

Described herein is a countermeasure against the reverse engineering of a cipher key as used in iterated block cipher based information security implementations under the white-box threat model. In one embodiment, a digital information security implementation uses column rotation on the cipher keys and cipher state to protect against reverse engineering and side channel attacks under a white box threat model. In the description below, the AES algorithm is used as an exemplary iterated block cipher, though the methods described may have applicability to other iterated block cipher algorithms.

An exemplary 16-byte block of AES data can be mapped into a 4×4 column major order matrix of bytes in the following configuration:

TABLE 1

| AES State | | | |
|---|---|---|---|
| 00 | 04 | 08 | 12 |
| 01 | 05 | 09 | 13 |
| 02 | 06 | 10 | 14 |
| 03 | 07 | 11 | 15 |

The byte representation of Table 1 can also be used for each 16-byte block of input data, each 16-byte output block, and each round key in the key schedule. For each round, one of four possible rotations can be applied to the AES state, ROT_0, through ROT_3 as shown in Table 2 below.

TABLE 2

| Column Rotations | | | | | | | | | | | | | | | |
|----|----|----|----|----|----|----|----|----|----|----|----|----|----|----|----|
| 00 | 04 | 08 | 12 | 04 | 08 | 12 | 00 | 08 | 12 | 00 | 04 | 12 | 00 | 04 | 08 |
| 01 | 05 | 09 | 13 | 05 | 09 | 13 | 01 | 09 | 13 | 01 | 05 | 13 | 01 | 05 | 09 |
| 02 | 06 | 10 | 14 | 06 | 10 | 14 | 02 | 10 | 14 | 02 | 06 | 14 | 02 | 06 | 10 |
| 03 | 07 | 11 | 15 | 07 | 11 | 15 | 03 | 11 | 15 | 03 | 07 | 15 | 03 | 07 | 11 |
| ROT_0 (identity) | | | | ROT_1 | | | | ROT_2 | | | | ROT_3 | | | |

The column rotation operation can be incorporated into the AES algorithm in a reversible manner, such that the pre-rotation data can be recovered after the completion of the cipher or decipher process. Each AES operation will be analyzed in turn to demonstrate the reversibility of the column rotation, where the column rotation state is tracked via the use of a "rotation index" ROT_i.

The AddRoundKey operation performs an XOR operation between the scheduled sub-key and the AES State matrix. The XOR can be performed on a byte-per-byte basis, so if the subkey and the AES State are rotated with the same rotation index i, the output will also be rotated with the same rotation index i, such that ROT_i(A XOR B)=ROT_i (A) XOR ROT_i (B). The SubByte operation is also a Byte-per-Byte operation, and the output does not depend on the ordering of the bytes, as in AddRoundKey. The MixColumn is an operation applying on the columns as unit, and the order of the columns does not impact the MixColumn operation. If the input state is rotated with a given rotation index i, the output state is also rotated with the same rotation index.

The ShiftRow operation is a reordering operation of the AES State when seen as a 4×4 column major order matrix. The bytes in each row are shifted circularly by a specific offset. Applying the ShiftRow operation, followed by a column-rotation by index i is the equivalent of applying a column rotation by index i then performing the ShiftRow Operation.

An embodiment of an implementation of electronic information security can utilize column rotation by rotating the cipher state and the round subkey during each round of the iterated block cipher, performing the iterated block cipher operations, and then un-rotating the output cipher block. The column rotations break mathematical correlations between data in memory that could be used to compromise the security of the system.

Figure 2:
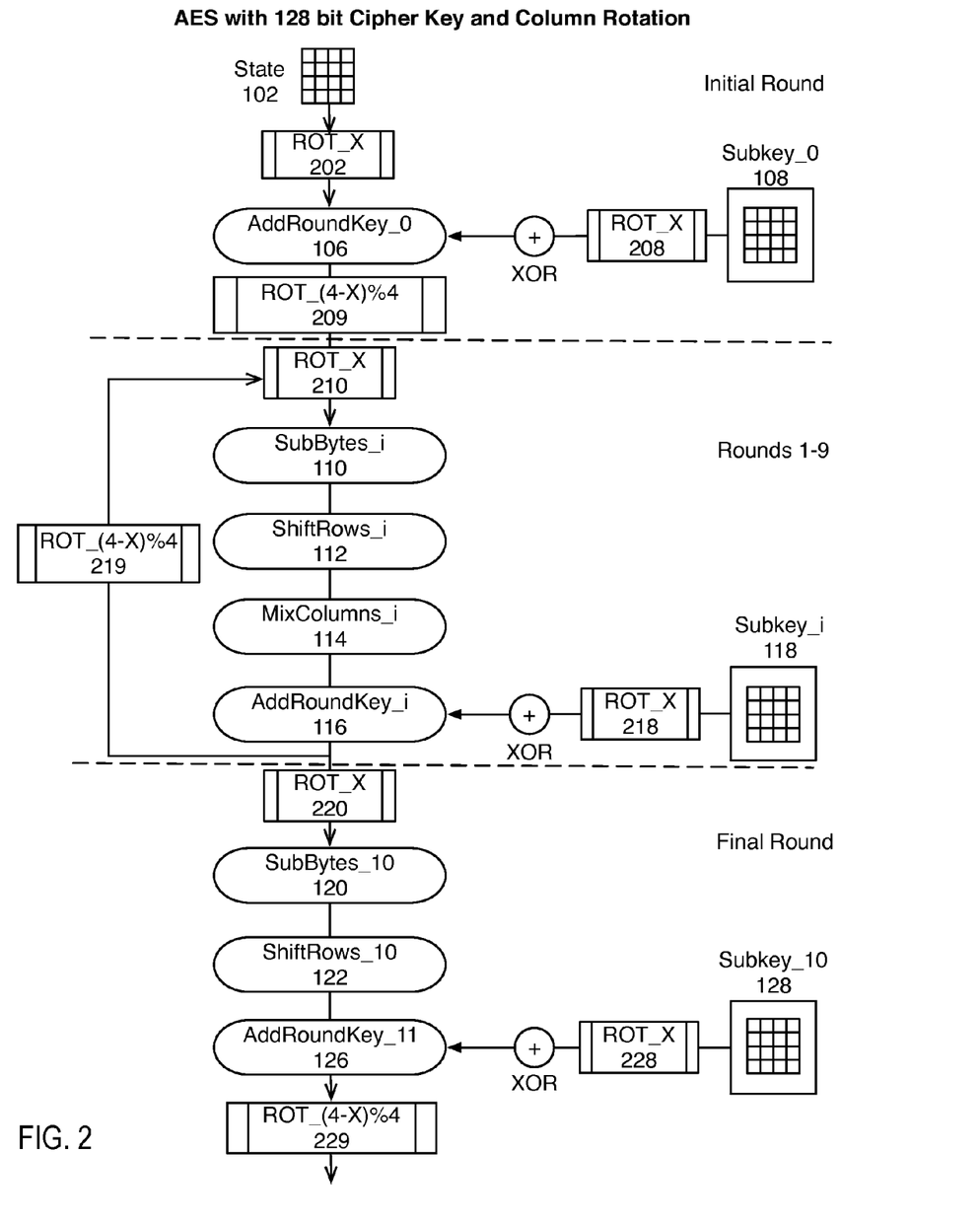
FIG. 2 is an illustration of a state buffer transition through the various operations of the AES algorithm when using column rotation, according to an embodiment.

FIG. 2 is an illustration of a state buffer transition through the various operations of the AES algorithm when using column rotation, according to an embodiment. In one embodiment, the rotation index is shifted between each cipher block, and the cipher state is un-rotated before the cipher block output stage. While AES-128 is used as an example, the embodiments described can also employ column rotation when using AES-192, AES-256, or some other iterated block cipher.

The state buffer 102 can be rotated 202 using a ROT_X rotation index before the initial AddRoundKey operation (e.g., AddRoundKey_0 106). The round key (e.g., Subkey_0 108) is rotated 208 using the same rotation index. After the AddRoundKey_0 106 operation of the initial round, a rotation 209 can be performed with an inverse rotation index, calculated as ROT_((4−X) % 4).

During rounds 1-9, a rotation 210 can be performed on the state buffer 102 before the main body of the cipher operations, then the SubBytes_i 110, ShiftRows_i 112, MixColumns_i 114, and AddRoundKey_i 116 are performed on the block cipher. Before the AddRoundKey_i 116 operation, Subkey_i 118 is rotated using the same rotation index ROT_X 218. At the end of the round, a rotation 219 is performed on the state buffer 102 with an inverse rotation index ROT_(4−X) % 4, which removes the column rotation from the block output.

During the final round, as in previous rounds, a rotation 220 can be performed on the state buffer 102, along with a rotation 228 of the final subkey (e.g., Subkey_10 128) using the same ROT_X rotation index, and a final rotation 229 can be performed on the state buffer 102 before the buffer is output as a ciphered block. To decipher the ciphered block, the AES inverse operations can be performed in reverse order. The use of column rotation during the encryption process does not require column rotation to be used during the decryption process, as the result of the operations is the same. However, data in the state buffer 102 and in memory buffers containing the various subkeys (e.g., Subkey_0 108, Subkey_i 118, Subkey_10 128) are obfuscated, making side channel attacks via data correlation more difficult for an attacker. The column rotation operation can also be used in addition to other hardware or software based memory obfuscation techniques to enhance information security.

Column rotation of the per-round subkeys generated by the key schedule algorithm can be implemented using various methods, and can be implemented at various points within a round of a cipher, while allowing the reversal of the rotations to be performed on the cipher data output. In one embodiment, the rotation index can be varied randomly between each round, or randomly for each cipher block. To avoid having to un-rotate, and then re-rotate the subkeys when changing rotations, it is possible for subkeys to "accumulate," or "aggregate" rotations.

Figure 3:
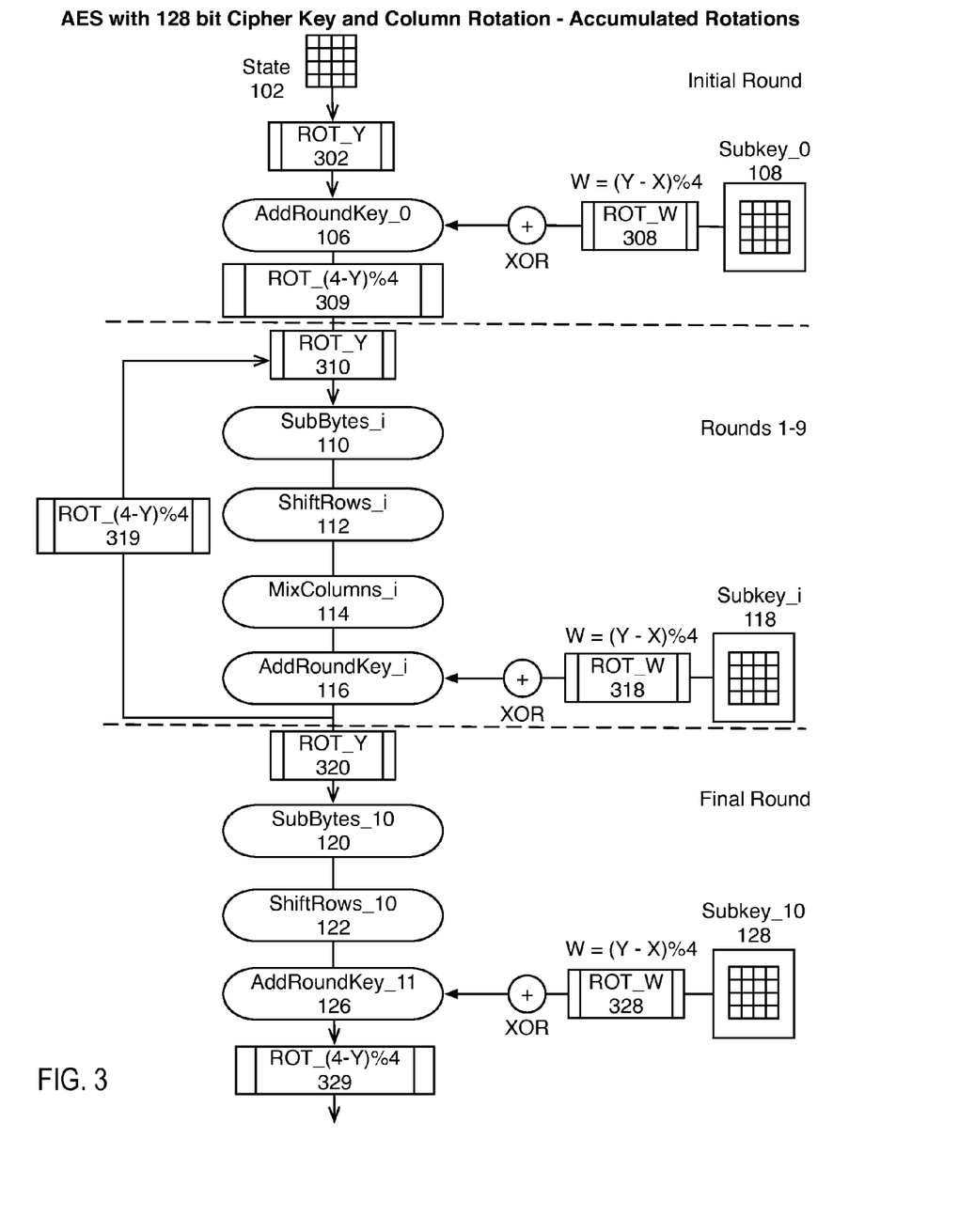
FIG. 3 is an illustration of a state buffer transition through the various operations of the AES algorithm when using column rotation with accumulated subkey rotations, according to an embodiment.

FIG. 3 is an illustration of a state buffer transition through the various operations of the AES algorithm when using column rotation with accumulated subkey rotations, according to an embodiment. As a key management optimization, instead of un-rotating each round subkey before using a new rotation index, the subkey can be rotated based on an intermediate rotation index in a single rotation. For example, a rotated key with rotation ROT_X can be rotated directly to a rotated key with rotation ROT_Y, by rotating the key by a ROT_W, which is ROT_((Y−X) % 4). Using similar operations as those illustrated in FIG. 2, a rotation 302 with rotation index ROT_Y, which is a different index than ROT_X can be performed on incoming unencrypted data. Subkey_0 108, having previously been rotated 208 with ROT_X, can be rotated with rotation index ROT_W 308, which is calculated as ROT_((Y−X) % 4), which produces equivalent results as a rotation using rotation index ROT_((4−X) % 4) followed by a rotation using rotation index ROT_Y.

After the AddRoundKey_0 106 operation, in which the rotated Subkey_0 is XORed with the rotated state buffer 102, a rotation 309 with rotation index ROT_((4−Y) % 4). Subsequent rounds can feature a rotation with rotation index ROT_Y (e.g., ROT_Y 310), or some other rotation index, and the subkey can be rotated to an appropriate rotation using the ((current rotation index)+(previous rotation index) % 4) formula, as additionally illustrated in rotation 318 and rotation 328. The inverse rotations (e.g., rotations 319, 329) are performed using the rotation index that is applied to the state buffer 102 at the beginning of each round (e.g., rotation 310 and rotation 320, which use the exemplary ROT_Y rotation index).

In one embodiment, each key of the round subkey schedule can be stored by column, such that all of the bytes corresponding to a given column i are stored in a 32 bit array. If a "word" is defined as 32 bits, then each array would be 4 words long, and there would be 11 lines of 4 words for the total set of subkeys. For example, for a set of arrays C1[11], C2[11], C3[11], C4[11], Ci[j] designates the i-th column of the j-th key. In this case, to perform a column rotation, it is sufficient to store the C1, C2, C3, and C4 pointers in an upper array, such as Carray [4], and rotate the pointers, C1, C2, C3 and C4 instead of rotating all of the keys. While such implementation allows for rapid subkey rotation, the subkeys are stored in a fixed order within the various memory buffers, so such implementations would benefit from additional memory obfuscation techniques.

Figure 4:
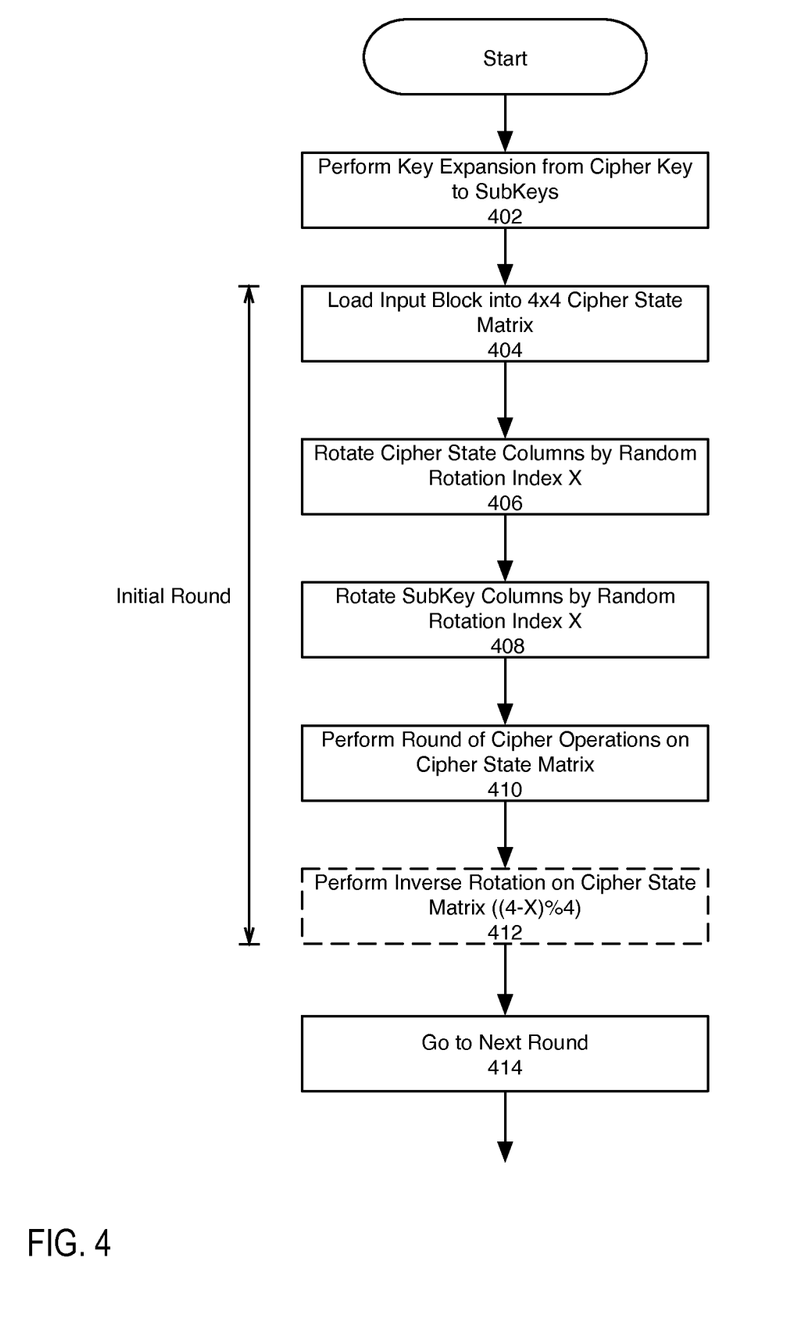
FIG. 4 is a logic diagram of an exemplary method of utilizing column rotation during an initial cipher round, according to an embodiment.

FIG. 4 is a logic diagram of an exemplary method of utilizing column rotation during an initial cipher round, according to an embodiment. An implementation can utilize specially optimized processors including cipher specific hardware, or one or more general-purpose processors to perform the various operations. First, a set of round keys for each round are generated by a key scheduler algorithm, as shown at 402. For each cipher block, as shown at 404, the unencrypted input block is loaded into a column major order cipher state matrix, which can be mapped from a linear buffer using the memory offset offset=row_i+column_j*NUMROWS, or each column can be stored in four separate 32 bit data blocks.

An embodiment can insert rotations at various points within the cipher, and recover the un-rotated data after operations have occurred. At 406, the cipher state columns can be rotated by a randomly determined rotation index X, and at 408, the subkey columns are rotated by the same rotation index. Once the round key and state are rotated, at 410 the cipher operations for that round of the iterated block cipher can be performed. In one embodiment, after the cipher operations for the round are performed, an inverse rotation can be performed at 412 by rotating the state using a rotation index calculated as ((4−X) % 4), which places the cipher state in the column configuration that would exist if the rotation operations were not performed. In one embodiment, the operation at 412 is bypassed, and the cipher state is allowed to accumulate rotations between rounds.

Figure 5:
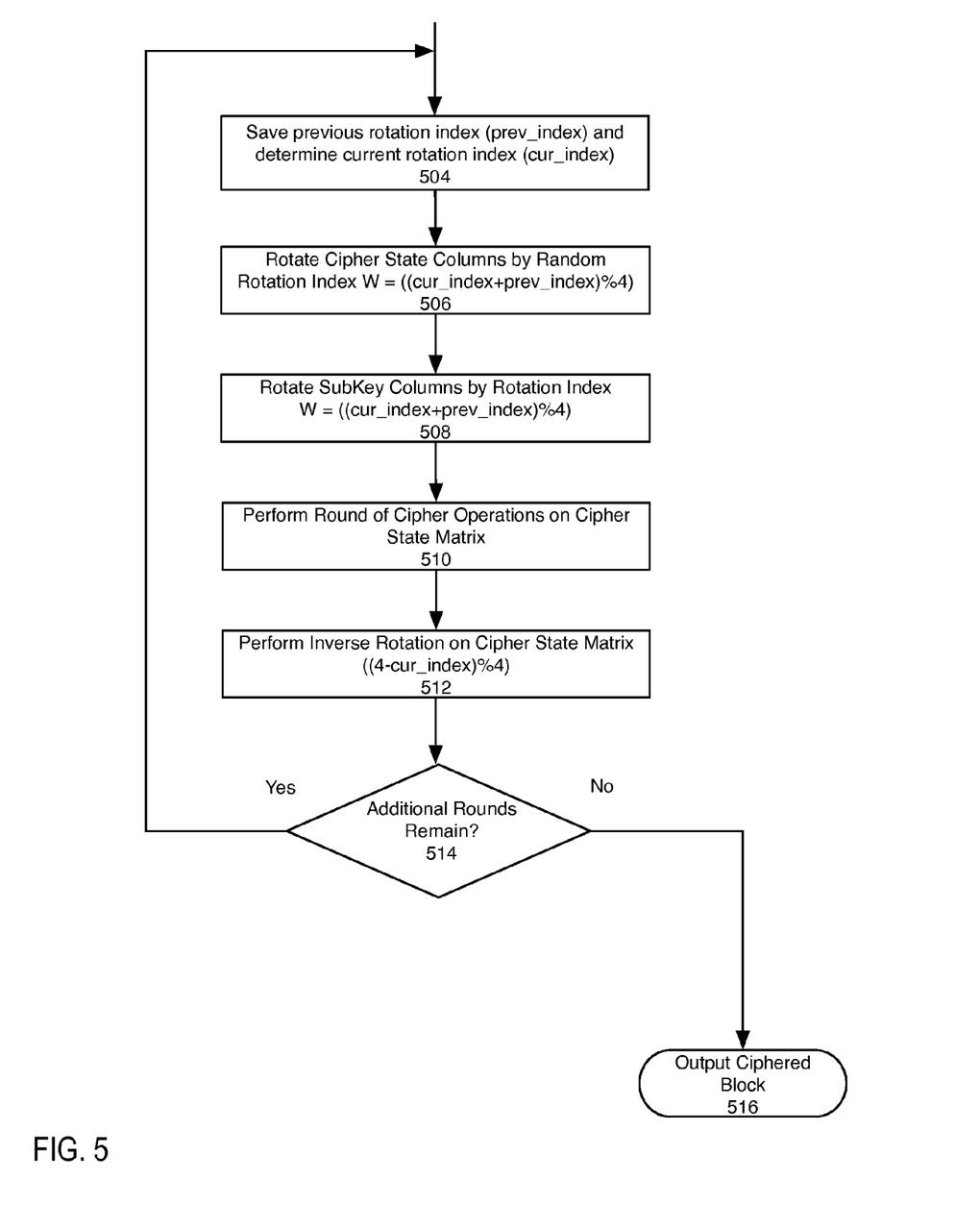
FIG. 5 is a logic diagram of an exemplary method of utilizing column rotation during additional cipher rounds, according to an embodiment.

To allow additional rotations using the accumulated rotation of the cipher state, index X is saved as a previous rotation value, as further illustrated in FIG. 5.

At 414, the state is processed in the next round of the cipher operation. A round of operations during a decipher operation is similar. At 410, decipher operations using the inverse of the cipher operations is performed in reversed order. The rotation of the state and round keys are performed as in the cipher round.

FIG. 5 is a logic diagram of an exemplary method of utilizing column rotation during additional cipher rounds, according to an embodiment. In one embodiment, rotation indexes can be randomly re-determined for each cipher block, or each round, as shown in the exemplary logic diagram of FIG. 5. In one embodiment, the cipher state matrix has the column rotations removed from the cipher state after the cipher operations using an inverse rotation index. In one embodiment, the cipher state accumulates rotations between cipher rounds.

Where previous rotations have been used and are still in place on the, at 504, the previous index is saved (prev_index), and the current rotation index (cur_index) for the round is determined. The rotation index can be randomly determined via a random number generator of an operating system, by encryption software using special purpose instructions provided by a general-purpose processor, or via a dedicated hardware random number generator coupled to the data processing system on which the information security system operates.

Such random rotation index can be used at 506 to rotate the cipher state columns. Both the cipher state columns, at 506, and the cipher round keys can be rotated at 508 using the accumulated rotation index W to rotate from the previous rotation index, to the current rotation index. At 510 the cipher (or decipher operations specific to the round can be performed, and the cipher column rotation can be removed from the cipher state at 512 using a rotation using rotation index ((4−cur_index) % 4). If additional rounds remain, as determined at 514, operation can return to 504. Once all cipher (or decipher) rounds have been performed, operation can proceed to 516, where the ciphered block is output to a memory buffer, or otherwise returned from the cipher operation.

Figure 6:
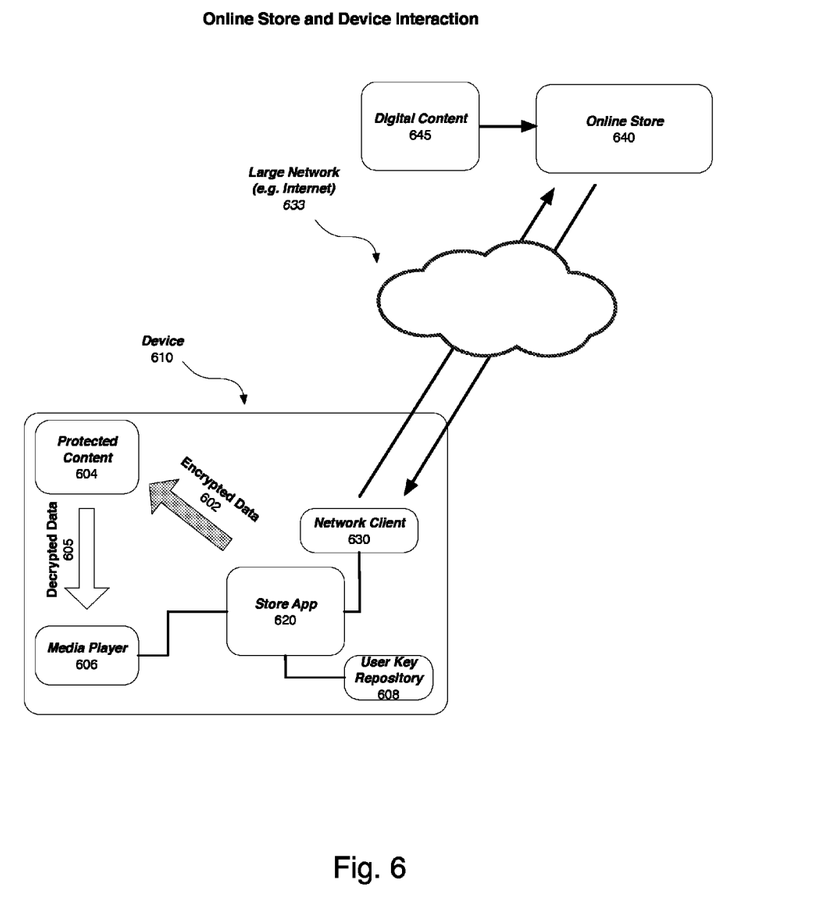
FIG. 6 is a block diagram of an interaction between an online media store and client device that can utilize an embodiment of column rotation to enhance information security.

FIG. 6 is a block diagram of an interaction between an online media store and client device that can utilize an embodiment of column rotation to enhance information security. In this example, a device 610 can execute media or application store software (e.g., Store App 620), such as the iTunes App Store, or iTunes Media store, both provided by Apple Inc. of Cupertino Calif. A network client 630 module allows the device 610 to communicate over a large network (e.g., Internet 633) to a remote Online Store 640. A user with an account on the Online Store 640-can use the account to purchase media or applications (e.g., apps) for use on the device 610.

One element of security available to the device 610 when communicating over a network is a secure socket implementation such as Transport Layer Security (TLS) that allows data to be encrypted during transport over the network. TLS uses both asymmetric (public/private key) and symmetric key encryption, and the network client 630, or associated software, can utilize an iterated block cipher, such as AES, for the symmetric key encryption portion of the data encryption.

Once a connection is established between the device 610 and the Online Store 640, a user can purchase digital content 645 (e.g., video, applications, books) that is made available via the store. Additionally, the user may be prompted to enter account credentials to verify that the user is a legitimate user of the account associated with the Online Store 640, which is a transaction that also benefits from the added security provided by column rotation during the cipher and decipher of encrypted data exchanged between the Online Store 640 and the Device 610.

Some media a user purchases from the online store uses a digital rights management (DRM) implementation, which can be provided via the use of an encryption algorithm enhanced with an embodiment of column rotation, such as the modified AES sequence described herein. Media content purchased from the Online Store 640 is downloaded to the device via the secure connection established by the network client 630. Once downloaded to the device 610, the Store App 620 encrypts the DRM protected content using a content cipher key, and the encrypted data 602 is stored on the device. The content key is then is encrypted using one of several possible user specific keys, which are associated with a specific user account of the online store. Additionally, the user keys can be stored in a user key repository 608, which can also be encrypted. When DRM protected content 604 is to be accessed by, for example, a media player 606, the appropriate user key is used to decrypt the content key, which is used to decrypt the protected content, and the decrypted data 605 can be accessed.

All of the encryption and decryption for the DRM process described above occurs on the user device, which potentially makes the various encryption keys vulnerable to side channel attacks. The use of an embodiment of the column rotation method described herein makes such attacks significantly more difficult. For additional discussion of DRM implementations and content decryption and playback, see Secure Distribution Of Content Using Decryption Keys, U.S. Pat. No. 7,936,873, which is hereby incorporated by reference.

Figure 7:
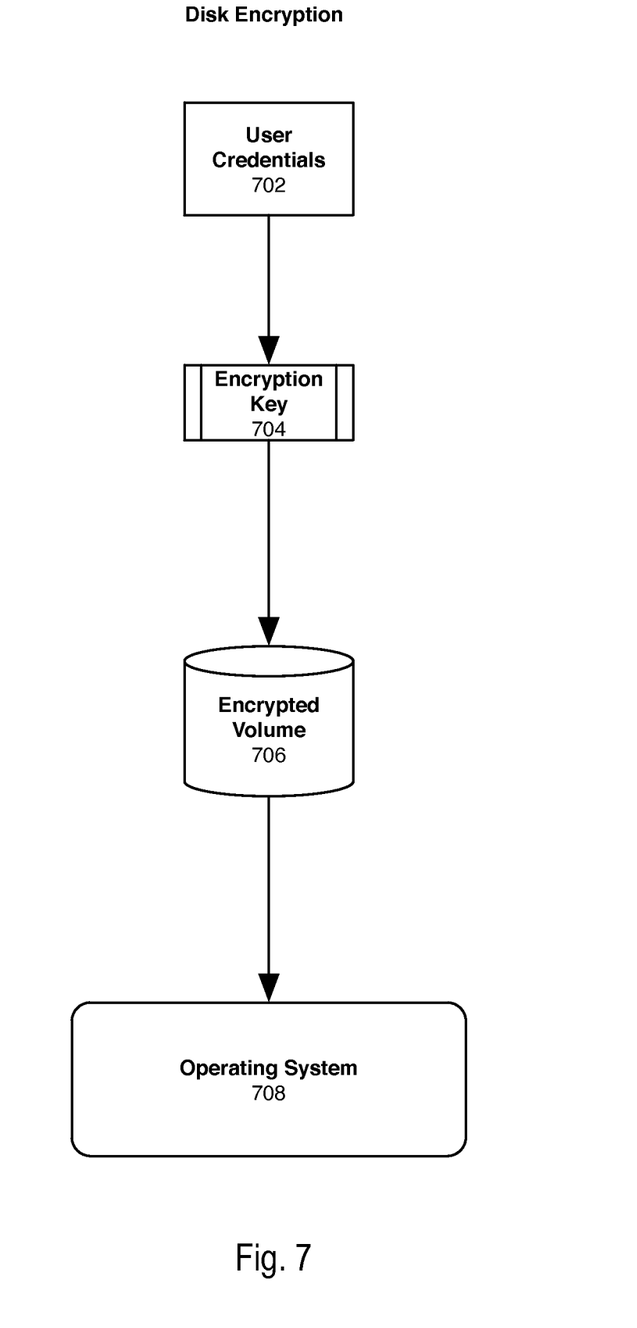
FIG. 7 illustrates an example of information security implementation for disk encryption that can benefit from an embodiment of column rotation.

FIG. 7 illustrates an example of information security implementation for disk encryption that can benefit from an embodiment of column rotation. Data processing systems can implement a variant of disk encryption that allows a user to access data on a data processing system only if the user possesses the appropriate credentials 702. Unauthorized users cannot bypass the boot login screen that gates access to the operating system 708. If an unauthorized user were to attempt to gain access to data by removing the storage device of the data processing system, the encrypted data would be inaccessible without the encryption key 704. However, an attacker may attempt to gain access to the encryption key 702 protecting the encrypted volume 706 using a side channel attack on the decryption implementation protecting the data. If the information security implementation uses an encryption algorithm such as AES, or another iterated block cipher, which may be enhanced by column rotation, side channel attacks, such as correlation attacks, become significantly more difficult.

Figure 8:
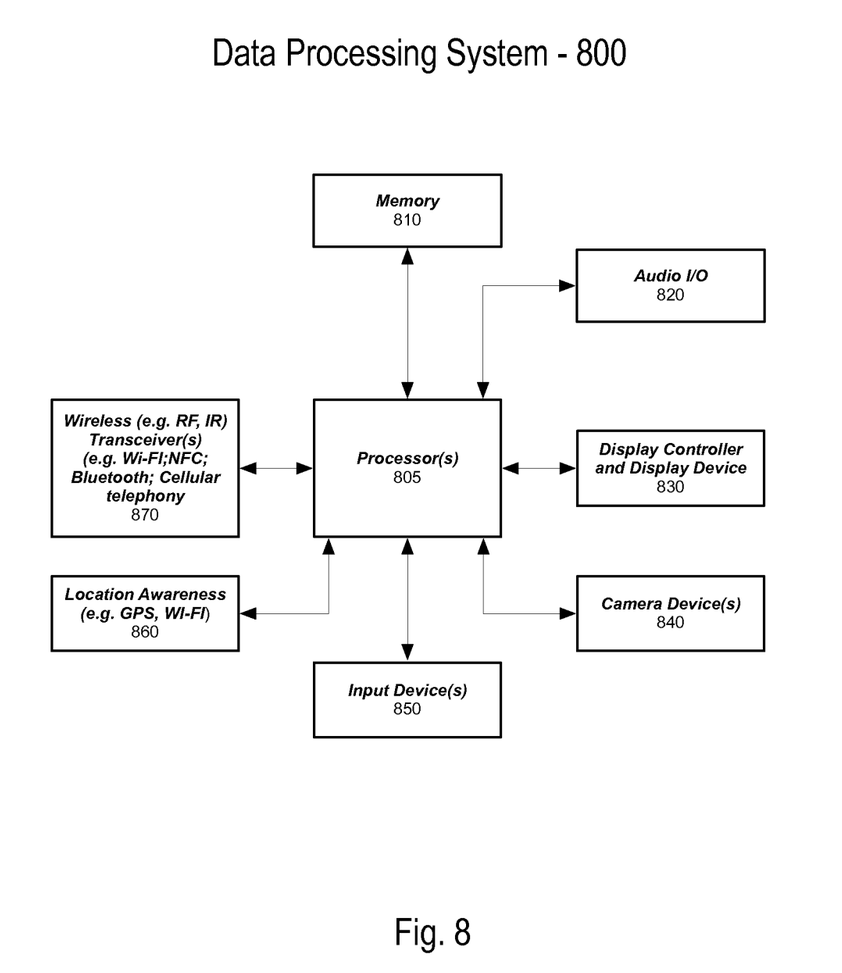
FIG. 8 is a block diagram illustrating a data processing system that can be used in an electronic device, according to an embodiment.

FIG. 8 is a block diagram illustrating a data processing system 800 that can be used in an electronic device, according to an embodiment. The data processing system of FIG. 8 can be a Macintosh computer, such as a Mac Pro, iMac, or MacBook; or can be a mobile computing device such as the iPhone, iPad, or iPod Touch device, all from Apple Inc. of Cupertino, Calif. The data processing system 800 can include a processing system 805 with one or more microprocessors. In one embodiment, the one or more microprocessors include hardware for accelerating cryptographic operations, including special purpose instructions to accelerate processor operations commonly used in cryptographic ciphers. For example, a processor of the one or more processors can include support for the Advanced Encryption Standard Instruction Set, or the Advances Encryption Standard New Instructions, or the processor can include support for the NEON vector instruction set, which includes support for cryptographic primitives. The system 800 can also include memory 810 for storing data and programs for execution by the processing system. The system 800 additionally includes an audio input/output subsystem 820 that may include a microphone and a speaker for playing back music or providing telephone functionality through the speaker and microphone.

A display controller and display device 830 can be used to provide a graphical user interface for the user, such as the graphics user interface provided by iOS devices such as, for example, the iPhone, iPad, and iPod touch. A wireless transceiver 870 can transmit and receive data via one or more wireless technologies such as Wi-Fi, infrared, Bluetooth, or one or more variants of wireless cellular technology. One embodiment of system 800 contains one or more camera devices 840 configured in both a front and rear facing configuration, though similarly configured systems each with a front facing camera can be one of many optimal configurations. The data processing system 800 can also include one or more input devices 850 that allow a user to provide input to the system. Input devices can include a keypad or keyboard, alone or in conjunction with a touch or multi touch panel that is overlaid on the display device 830. Additionally, embodiments of the data processing system 800 can also include a device for providing location awareness services, such as a Global Positioning System (GPS) device 860 or its equivalent.

It is to be noted that the data processing system 800 as represented in FIG. 8 is by way of example. One or more buses or interfaces, which are not shown, can be used to interconnect the various components, as is well known in the art. As well, additional components, not shown, may also be part of the system 800 in certain embodiments, and in certain embodiments fewer components than shown in FIG. 8 may also be used.

Figure 9:
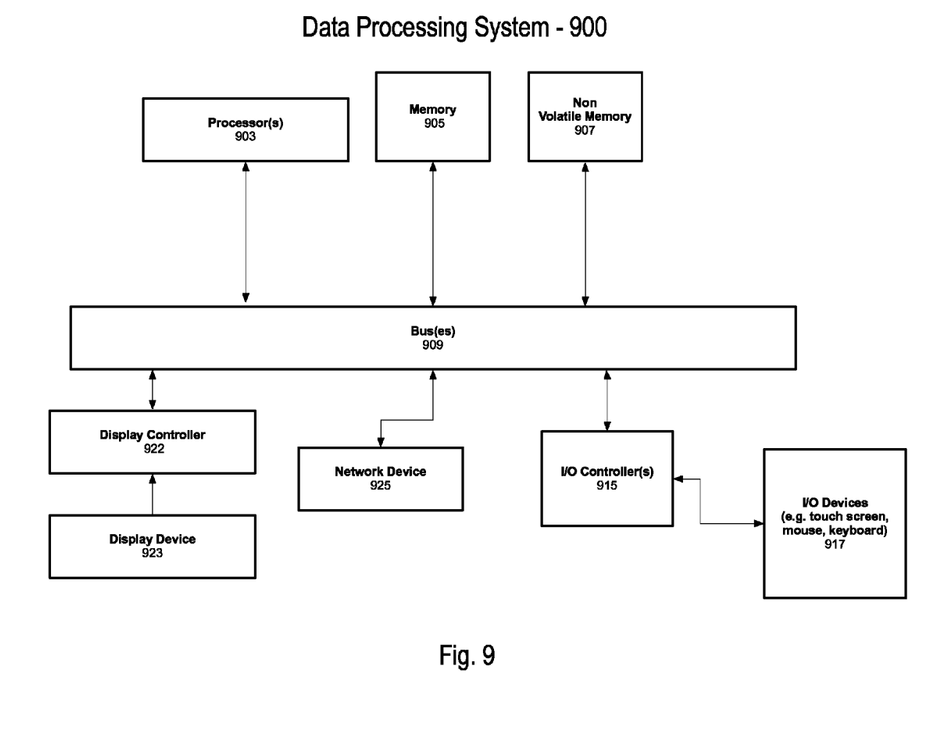
FIG. 9 is a block diagram illustrating an additional data processing system, according to an embodiment.

FIG. 9 is a block diagram illustrating an additional data processing system, according to an embodiment. Note that while FIG. 9 illustrates the various components of a data processing system, such as a computer system, it is not intended to represent any particular architecture or manner of interconnecting the components as such details are not germane to the embodiments described. It will also be appreciated that other types of data processing systems, which have fewer components than shown or more components than shown in FIG. 9, may also be used. As shown in FIG. 9, the data processing system 900 includes one or more buses 909, which serve to interconnect the various components of the system. One or more processors 903, each containing one or more processor cores, are coupled to the one or more buses 909 as is known in the art. Memory 905 may be volatile Sequential DRAM, nonvolatile RAM or may be flash memory or other types of memory. This memory is coupled to the one or more buses 909 using techniques known in the art.

In one embodiment, the one or more microprocessor cores include hardware for accelerating cryptographic operations, including special purpose instructions to accelerate processor operations commonly used in cryptographic ciphers. For example, a processor of the one or more processors can include support for the Advanced Encryption Standard Instruction Set, or the Advances Encryption Standard New Instructions, or the processor can include support for the NEON vector instruction set, which includes support for cryptographic primitives.

The data processing system 900 can also include nonvolatile memory 907 which may be a hard disk drive or a flash memory or a magnetic optical drive or magnetic memory or an optical drive or other types of memory systems which maintain data after all power is removed from the system. The nonvolatile memory 907 and the memory 905 can both couple to the one or more buses 909 using known interfaces and connection techniques. A display controller 922 is coupled to the one or more buses 909 in order to receive display data to be displayed on a display device 923 which can display any one of the user interface features or embodiments described herein. The display device 923 can include an integrated touch input to provide a touch screen. The data processing system 900 can also include one or more input/output (I/O) controllers 915, which provide interfaces for one or more I/O devices such as one or more mice, touch screens, touch pads, joysticks, and other input devices including those known in the art. The I/O controller can also provide interfaces for one or more output devices (e.g., speakers). The input/output devices 917 are coupled through one or more I/O controllers 915 as is known in the art. Additionally, one or more network interfaces 925 can also be coupled to the one or more buses to provide access to one or more networks.

While FIG. 9 shows that the nonvolatile memory 907 and the memory 905 are coupled to the one or more buses directly rather than through a network interface, it will be appreciated that the data processing system can utilize a nonvolatile memory which is remote from the system, such as a network storage device which is coupled to the data processing system through a network interface such as a modem or Ethernet interface or wireless interface, such as a wireless Wi-Fi transceiver or a wireless cellular telephone transceiver or a combination of such transceivers. As is known in the art, the one or more buses 909 may include one or more bridges or controllers or adapters to interconnect between various buses. In one embodiment, the I/O controller 915 includes a USB adapter for controlling USB peripherals and can control an Ethernet port or a wireless transceiver or combination of wireless transceivers.

The techniques and methods described herein may be carried out in a data processing system in response to its processor executing a sequence of instructions contained in a volatile, non-transitory memory such as the memory 905 or the non-volatile memory 907 or a combination of such memories. In various embodiments, hardwired circuitry may be used in combination with software instructions, thus the techniques are not limited to any specific combination of hardware circuitry and software or to any particular source for the instructions executed by the data processing system.

Non-transitory machine readable storage medium comprises any type of machine readable storage medium, including floppy disks, flash memory devices, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, as opposed to media specifically designed or designated for carrying transitory, propagating signals. In various embodiments, software-instructions stored on a machine-readable storage medium can be used in combination with hardwired circuitry. Thus the techniques are not limited to any specific combination of hardware circuitry and software, or to any particular source for the instructions executed by the data processing system associated an apparatus for performing one or more of the operations described herein.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

What is claimed is:

1. A computer implemented method of performing an iterated block cipher having resistance to cipher key reverse engineering, the method comprising:
generating an iteration specific cipher subkey for multiple iterations of the iterated block cipher;
using one or more processors, rotating columns of a memory buffer corresponding to a cipher state matrix, the memory buffer rotated according to a first rotation index;
performing a first rotation of the columns of a first iteration specific cipher subkey according to the first rotation index;
performing an iteration of block cipher operations on the memory buffer corresponding to the cipher state matrix;
rotating the columns of the cipher state matrix in the corresponding memory buffer according to a second rotation index and an inverse of the first rotation index using a rotation to an intermediate rotation index;
rotating the columns of the iteration specific cipher subkey to the second rotation index without reversing the first rotation of the subkey; and
generating an output cipher block from the cipher state matrix.

2. The method of claim 1, further comprising:
generating the iteration specific cipher subkey for each iteration of the block cipher; and
performing an accelerated iteration of one or more block cipher operations on the cipher state matrix using a hardware instruction of the one or more processors.

3. The method of claim 2, wherein the hardware instruction is consistent with the Advanced Encryption Standard (AES).

4. The method of claim 1, wherein a cipher state column is rotated according to a second rotation index without reversing the first rotation according to the first rotation index.

5. The method of claim 1, wherein the cipher state matrix is a 4×4 column major order matrix.

6. The method of claim 1, wherein a first input block to the iterated block cipher includes media content protected by a digital rights management (DRM) implementation.

7. The method of claim 1, wherein a first input block to the iterated block cipher includes data protected by a disk volume encryption implementation.

8. The method of claim 1, wherein a first input block to the iterated block cipher includes user account authentication data.

9. The method of claim 1, further comprising initializing the cipher state matrix with a second input block.

10. The method of claim 1 wherein the iterated block cipher is performed using an algorithm that is consistent with the Advanced Encryption Standard (AES).

11. An electronic device having an iterated block cipher based information security system having resistance to cipher key reverse engineering, the electronic device comprising:
a data storage, to store protected data;
an encrypted key repository stored on the data storage;
a network client, to communicate over a network with an online store; and
a processor coupled to the network client and the data storage, the processor having one or more cores, to process instructions to manage the iterated block cipher based information security system, wherein the instructions cause the processor to:
generate an iteration specific cipher subkey for multiple iterations of the iterated block cipher;
rotate columns of a memory buffer corresponding to a cipher state matrix, the memory buffer rotated according to a first rotation index;
rotate the columns of an iteration specific cipher subkey according to the first rotation index;
perform an iteration of block cipher operations on the memory buffer corresponding to the cipher state matrix;

rotate the columns of the cipher state matrix in the corresponding memory buffer according to a second rotation index and an inverse of the first rotation index using a rotation to an intermediate rotation index;

rotate the iteration specific cipher subkey to the second rotation index without reversing the first rotation of the subkey; and generate an output cipher block from the cipher state matrix.

12. The electronic device of claim 11, wherein one or more cores of the processor include hardware instructions to accelerate the iterated block cipher.

13. The electronic device of claim 12, wherein the hardware instructions accelerate an iterated block cipher consistent with the Advanced Encryption Standard (AES).

14. The electronic device of claim 11, wherein the data store includes an encrypted storage volume.

15. The electronic device of claim 14, wherein an encryption key for the encrypted storage volume is stored in the encrypted key repository.

16. One or more non-transitory computer readable media storing instructions to manage an iterated block cipher based information security system having resistance to cipher key reverse engineering, the instructions which, when performed by one or more processors, cause the one or more processors to perform operations comprising:

loading a first input block of unencrypted data into a memory buffer, the memory buffer corresponding to a cipher state matrix of the iterated block cipher;

rotating columns of the cipher state matrix in the corresponding memory buffer according to a first rotation index, wherein the cipher state matrix is a 4×4 column major order matrix;

performing a first rotation of the columns of an iteration specific cipher subkey according to the first rotation index;

performing an iteration of the block cipher operations on the memory buffer corresponding to the cipher state matrix;

rotating the columns of the cipher state matrix in the corresponding memory buffer according to a second rotation index and an inverse of the first rotation index using a rotation to an intermediate rotation index;

performing a second rotation of the columns of the iteration specific cipher subkey to the second rotation index without reversing the first rotation of the subkey; and generating an output cipher block from the cipher state matrix.

17. The computer readable media of claim 16, further comprising accelerating an iteration of block cipher operations on the cipher state matrix using a hardware instruction of the one or more processors, the hardware instruction consistent with the Advanced Encryption Standard (AES).

18. The computer readable media of claim 17, further comprising rotating the columns of the cipher state matrix in the corresponding memory buffer according to the second rotation index, without reversing the first rotation according to the first rotation index.

19. The computer readable media of claim 16, wherein the first input block includes media content protected by a digital rights management (DRM) implementation.

20. The computer readable media of claim 16, wherein the first input block includes data protected by a disk volume encryption implementation.

* * * * *